(12) United States Patent
Katayama et al.

(10) Patent No.: US 12,084,541 B2
(45) Date of Patent: Sep. 10, 2024

(54) POLYLACTIC ACID SOLID COMPOSITION AND METHOD FOR PRODUCING THE SAME

(71) Applicant: TOYO SEIKAN GROUP HOLDINGS, LTD., Tokyo (JP)

(72) Inventors: Tsutaki Katayama, Yokohama (JP); Seishi Yoshikawa, Yokohama (JP); Koki Shibata, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 430 days.

(21) Appl. No.: 17/598,355

(22) PCT Filed: Mar. 30, 2020

(86) PCT No.: PCT/JP2020/014453
§ 371 (c)(1),
(2) Date: Sep. 27, 2021

(87) PCT Pub. No.: WO2020/203946
PCT Pub. Date: Oct. 8, 2020

(65) Prior Publication Data
US 2022/0185952 A1 Jun. 16, 2022

(30) Foreign Application Priority Data
Mar. 29, 2019 (JP) .................................. 2019-067688

(51) Int. Cl.
C08G 63/08 (2006.01)
C08K 3/105 (2018.01)
C08K 3/26 (2006.01)

(52) U.S. Cl.
CPC .............. *C08G 63/08* (2013.01); *C08K 3/105* (2018.01); *C08K 3/26* (2013.01)

(58) Field of Classification Search
CPC ... C08G 63/08; C08J 2300/12; C08J 2367/04; C08J 3/201; C08K 2003/262; C08K 3/105; C08K 3/26; C08L 67/04
See application file for complete search history.

(56) References Cited

U.S. PATENT DOCUMENTS

| 2002/0123546 A1* | 9/2002 | Bigg ..................... D21H 17/53 528/355 |
| 2013/0184415 A1 | 7/2013 | Yoshikawa et al. |
| 2013/0274373 A1 | 10/2013 | Yoshikawa et al. |
| 2017/0015806 A1 | 1/2017 | Yoshikawa et al. |
| 2021/0269587 A1 | 9/2021 | Shibata et al. |

FOREIGN PATENT DOCUMENTS

| CN | 103210043 A | 7/2013 |
| CN | 107286613 A | 10/2017 |
| CN | 112399979 A | 2/2021 |
| JP | 2011-104551 A | 6/2011 |
| JP | 5633291 B2 | 12/2014 |
| JP | 2019-062808 A | 4/2019 |
| WO | 2012/099017 A1 | 7/2012 |
| WO | 2015/068742 A1 | 5/2015 |

OTHER PUBLICATIONS

Written Opinion of the International Searching Authority for Parent Application PCT/JP2020/014453 mailed to Applicant on Jun. 9, 2020 (Year: 2020).*
Jin Li et al "The Degradation of Polylactic Acid Fiber", Proceedings of the 2010 International Conference on Information Technology and Scientific Management (Year: 2010).*
David Grewell et al "Depolymerization of Post-Consumer Polylactic Acid Products", J. Renew. Mater., vol. 2, No. 3, Aug. 2014 © 2014 Scrivener Publishing LLC 157 (Year: 2014).*
Office Action issued Sep. 15, 2022 in corresponding Chinese Patent Application No. 202080025973.4.
International Search Report for PCT/JP2020/014453 dated Jun. 9, 2020 [PCT/ISA/210].

* cited by examiner

*Primary Examiner* — Frances Tischler
*Assistant Examiner* — Gennadiy Mesh
(74) *Attorney, Agent, or Firm* — Sughrue Mion, PLLC

(57) ABSTRACT

A polylactic acid solid composition includes: a polylactic acid having a weight average molecular weight of not more than 40,000, which is measured in terms of polystyrene standard by GPC; and a basic compound of an alkali metal or an alkaline earth metal, which is a residue of a molecular weight reduction accelerator. The basic compound is contained in an amount in a range of 0.5 to 20 mass %.

2 Claims, 3 Drawing Sheets

POLYLACTIC ACID SOLID COMPOSITION AND METHOD FOR PRODUCING THE SAME

CROSS REFERENCE TO RELATED APPLICATIONS

This application is a National Stage of International Application No. PCT/JP2020/014453 filed Mar. 30, 2020, claiming priority based on Japanese Patent Application No. 2019-067688 filed Mar. 29, 2019.

TECHNICAL FIELD

The present invention relates to a polylactic acid solid composition and a method for producing the same. More specifically, the present invention relates to a polylactic acid solid composition that has improved crushability, contains a low molecular weight polylactic acid as a polymer component, and is available to use as a fine granular material; and a method for producing the same.

BACKGROUND ART

Polylactic acid is known as an environmentally friendly biodegradable resin and is used in various applications.

Recently, it has been proposed to use polylactic acid in a soil cleaning method with the use of microorganisms (which is referred to as bioremediation). Lactic acid, which is produced by the hydrolysis of polylactic acid, serves as a nutritive source for microorganisms. Thus, by spraying polylactic acid to impregnate the soil therewith, the propagation and activity of microorganisms can be enhanced.

For example, Patent Document 1 discloses a polylactic acid resin in a solid state with a weight average molecular weight of not more than 12,000, and proposes to use such a low molecular weight polylactic acid resin as a nutrient. This polylactic acid resin has such a molecular weight that it is not converted to liquid form, and thus it can be packed in a bag to achieve excellent transportability and also exhibits excellent workability. In addition, the lower molecular weight contributes to achieving highly sustained release of lactic acid and obtaining a highly efficient nutritive source for enzymes.

In the meantime, a low molecular weight polylactic acid resin intended for use for the aforementioned purpose is produced by heating a high molecular weight polylactic acid under high pressure by using an autoclave, for the following reasons. That is, it involves a high cost to produce a low molecular weight polylactic acid by polymerization of monomers, and besides, this method results in also producing a polylactic acid with a lower-than-necessary molecular weight. It is indeed possible to exclude such a polylactic acid with an excessively low molecular weight by, for example, fractionating the polylactic acid obtained, thereby preparing a polylactic acid with a molecular weight within an intended range. However, this further increases the cost.

The lower molecular weight polylactic acid used in Patent Document 1 has a problem in crushability. More specifically, this polylactic acid has a pellet form with a particle diameter on the order of mm, and cannot be crushed into fine granular materials. This seems to be because the lower molecular weight polylactic acid is obtained by heating under high pressure, so that it contains a large amount of low molecular weight components that cause stickiness and the like.

Further, Patent Document 2 discloses a biodegradable resin composition that includes a hardly hydrolysable biodegradable resin (A), an ester decomposition accelerator (B) formed of an easily hydrolysable polymer, and an ester decomposition accelerator auxiliary (C). Patent Document 2 describes using a polylactic acid as the hardly hydrolysable biodegradable resin (A), acid-releasing polyester such as polyoxalate as the ester decomposition accelerator (B), and a basic inorganic compound such as calcium carbonate or sodium carbonate as the ester decomposition accelerator auxiliary (C).

The technique of Patent Document 2 has achieved improved hydrolyzability of a hardly hydrolysable resin such as a polylactic acid. However, it requires to use as the ester decomposition accelerator (B) an easily hydrolysable polymer such as polyoxalate which is high in cost. Thus, it becomes a problem in terms of cost to use this technique for modifying a polylactic acid by, for example, reducing its molecular weight.

Further, since the ester decomposition accelerator auxiliary (C) in the technique of Patent Document 2 is used for accelerating the hydrolysis of the ester decomposition accelerator (B), no consideration is given in Patent Document 2 to whether or not the auxiliary (C) contributes to reducing the molecular weight of the hardly hydrolysable resin.

Further, the patent applicant previously proposed a method for reducing the molecular weight of a high molecular weight polylactic acid, in which the polylactic acid (aliphatic polyester) is introduced in a solution containing an organic acid, followed by heating (JP 2017-191573, JP 2019-65159 A).

According to this method, a low molecular weight polylactic acid can be obtained at a low cost. However, the lower molecular weight polylactic acid is obtained in a state of being dissolved or dispersed in the liquid, which results in the need to improve handleability.

PRIOR ART DOCUMENTS

Patent Documents

Patent Document 1: JP 2011-104551 A
Patent Document 2: JP 5633291 B2

SUMMARY OF THE INVENTION

Problems to be Solved by the Invention

Therefore, an object of the present invention is to provide a polylactic acid solid composition that contains a low molecular weight polylactic acid as a polymer component, is produced at a low cost without using a liquid such as an organic solvent and an expensive ester decomposition accelerator such as an easily hydrolysable polymer, and exhibits excellent crushability and sustained release of lactic acid; and a method for producing the same.

Means for Solving the Problems

The present invention provides a polylactic acid solid composition including: a polylactic acid having a weight average molecular weight of not more than 40,000, which is measured in terms of polystyrene standard by GPC; and a basic compound of an alkali metal or an alkaline earth metal, which is a residue of a molecular weight reduction accelerator. The basic compound is contained in an amount in a range of 0.5 to 20 mass %.

In the polylactic acid solid composition of the present invention, it is suitable that:
(1) the polylactic acid has a weight average molecular weight in a range of 12,000 to 40,000;
(2) the polylactic acid solid composition has a granular form with an average particle diameter ($D_{50}$) of not more than 10 μm, which is measured by a laser diffraction scattering method;
(3) the polylactic acid solid composition has a mesh pass particle size of not more than 10 μm;
(4) the basic compound is sodium carbonate;
(5) the polylactic acid is the only polymer component contained therein; and
(6) the polylactic acid solid composition is packed in a bag.

Further, present invention provides a method for producing a polylactic acid solid composition including:
preparing a high molecular weight polylactic acid having a weight average molecular weight of not less than 150,000, which is measured in terms of polystyrene standard by GPC; and melt-kneading the high molecular weight polylactic acid and a basic compound of an alkali metal or an alkaline earth metal so as to reduce the weight average molecular weight of the high molecular weight polylactic acid to not more than 40,000.

In the production method of the present invention, it is suitable that:
(1) the melt-kneading is performed under ordinary pressure at a temperature in a range of 220° C. to 250° C.;
(2) the melt-kneading is performed by using an extruder; and
(3) the basic compound is used in an amount in a range of 1 to 30 parts by mass per 100 parts by mass of the polylactic acid.

In the present invention, the solid composition refers to a material that is neither in liquid form nor the form of being dispersed in a liquid, but is present as a solid without exhibiting fluidity and viscosity at least at room temperature (23° C.)

Effects of the Invention

The polylactic acid solid composition of the present invention is obtained by reducing the molecular weight of a high molecular weight polylactic acid by melt-kneading without using water and an organic solvent, and contains as a polymer component a low molecular weight polylactic acid having a weight average molecular weight of not more than 40,000, particularly not more than 35,000, which is measured in terms of polystyrene standard by GPC. Further, the polylactic acid solid composition contains 0.5 to 20 mass % of a basic compound (molecular weight reduction accelerator) of an alkali metal or an alkaline earth metal used to reduce the molecular weight. Namely, since the molecular weight is reduced by melt-kneading in the presence of the basic compound without using a liquid, the polylactic acid solid composition results in containing a certain amount of the basic compound as an essential component.

The melt viscosity of the low molecular weight polylactic acid obtained by melt-kneading is too low to be measured by a melt indexer. Namely, since the low molecular weight polylactic acid has an extremely low weight-average molecular weight, the polylactic acid solid composition containing this polylactic acid as a polymer component is excellent in mechanical crushability, so that it can be crushed into fine granular materials with an average particle diameter ($D_{50}$) of not more than 10 μm, which is measured by a laser diffraction scattering method, and further into extremely fine granular materials with a mesh pass particle size of not more than 10 pm. For example, in the case of a solid composition containing a polylactic acid with a weight average molecular weight higher than the aforementioned range, such a solid composition is difficult to pulverize and can only be crushed to a particle diameter of approximately 125 μm. Needless to say, it is impossible to obtain a fine granular material with a mesh pass particle size of not more than 10 μm.

Further, in spite of the melt viscosity being too low to be measured by a melt indexer, the low molecular weight polylactic acid in the solid composition of the present invention contains only a very small amount of components with an excessively low molecular weight. For example, as shown in Examples to be described later, the weight average molecular weight is higher than 12,000. Further, as a result of containing few components with an excessively low molecular weight, the low molecular weight polylactic acid has a molecular weight distribution with an extremely sharp monodisperse peak (see the molecular weight distribution curve) showing that no component with a molecular weight of not more than 8,000 is substantially contained.

Further, the solid composition containing the above-described low molecular weight polylactic acid according to the present invention is extremely inexpensive because it does not contain easily hydrolysable polyester such as polyoxalate which is high in cost. Furthermore, since the solid composition of the present invention is not obtained in a state of being dispersed in a liquid, it can be immediately subjected to mechanical crushing or the like to be made available, is easily produced, and is excellent in handleability and the like.

The polylactic acid solid composition of the present invention exhibits excellent sustained release of lactic acid due to the lower molecular weight polylactic acid. In particular, the polylactic acid solid composition mechanically crushed into fine granular materials has a significant advantage in package performance, transportability, workability and the like, and is extremely suitable for use as a soil modifier. When this solid composition is sprayed in soil, the basic compound such as sodium carbonate contained in the solid composition is dissolved in soil moisture to become alkaline, which accelerates the hydrolysis of the polylactic acid contained in the solid composition. As a result, the amount of lactic acid which serves as a nutritive source for enzymes is increased, so that the soil is advantageously activated. Further, the granulated solid composition may also be introduced to water to prepare an aqueous dispersion for suitable use in underground resource mining.

MODE FOR CARRYING OUT THE INVENTION

<Production of polylactic acid solid composition>

Figure 1:
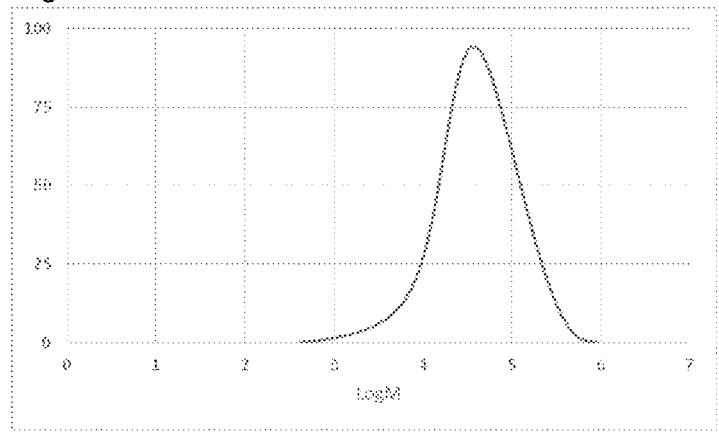
FIG. 1: a diagram illustrating the weight average molecular weight distribution curve of a polylactic acid in a polylactic acid solid composition obtained in Example 1.

A polylactic acid solid composition of the present invention is produced by melt-kneading a high molecular weight polylactic acid and a basic compound. More specifically, the molecular weight of the high molecular weight polylactic acid is reduced in solid phase in the presence of the basic compound, thereby obtaining an intended low molecular weight polylactic acid. Namely, the melt-kneading does not require easily hydrolysable polyester such as polyoxalate but uses only the basic compound as a decomposition accelerator. As a result, it is possible to moderately reduce the molecular weight of the high molecular weight polylactic acid, resulting in a polylactic acid solid composition that contains as a polymer component a low molecular weight polylactic acid containing no component with an excessively low molecular weight.

High Molecular Weight Polylactic Acid:

The high molecular weight polylactic acid to be subjected to molecular weight reduction has a weight average molecular weight (Mw) of not less than 150,000, particularly not less than 170,000, which is measured in terms of polystyrene standard by GPC (Gel Permeation Chromatography). When the weight average molecular weight is lower than this range, such a polylactic acid contains a large amount of low molecular weight components, which are subjected to further molecular weight reduction. Thus, it is inappropriate to use such a polylactic acid for obtaining a low molecular weight polylactic acid that contains no component with an excessively low molecular weight. On the other hand, in the case of using a polylactic acid with an excessively high molecular weight, it takes a long time to reduce the molecular weight, or in some cases it may be impossible to reduce the molecular weight. On this account, it is suitable that the weight average molecular weight is preferably not more than 200,000.

The above-described polylactic acid may be either a 100% poly-L-lactic acid or a 100% poly-D-lactic acid, a melt blend of a poly-L-lactic acid and a poly-D-lactic acid, or a random or block copolymer of a L-lactic acid and a D-lactic acid.

Further, the high molecular weight polylactic acid may be copolymerized with a small amount (e.g., not more than 10 parts by mass per 100 parts by mass of the polylactic acid) of various aliphatic polyhydric alcohols, aliphatic polybasic acids, hydroxycarboxylic acids, lactones or the like, as long as the molecular weight is within the aforementioned range so that molecular weight reduction is not hindered, and features such as mechanical crushability, hydrolyzability, sustained release of lactic acid and the like are not impaired.

Examples of the polyhydric alcohols include ethylene glycol, propylene glycol, butanediol, octanediol, dodecanediol, neopentyl glycol, glycerin, pentaerythritol, sorbitan, and polyethylene glycol.

Examples of the polybasic acids include oxalic acid, succinic acid, adipic acid, sebacic acid, glutaric acid, decanedicarboxylic acid, cyclohexanedicarboxylic acid, and terephthalic acid. Examples of the hydroxycarboxylic acids include glycolic acid, hydroxypropionic acid, hydroxyvaleric acid, hydroxycaproic acid, and mandelic acid.

Examples of the lactones include caprolactone, butyrolactone, valerolactone, propiolactone, undecalactone, glycolide, and mandelide.

Basic Compound:

The present invention uses the basic compound for accelerating molecular weight reduction by melt-kneading to be described later. Namely, by melt-kneading in the presence of the basic compound, the ester units of the high molecular weight polylactic acid are decomposed, so that the molecular weight of the polylactic acid can be reduced.

The basic compound contains an alkali metal or an alkaline earth metal. Examples thereof include sodium carbonate, potassium carbonate, calcium carbonate, magnesium carbonate, sodium hydrogen carbonate, potassium bicarbonate, sodium silicate, potassium silicate, calcium silicate, magnesium silicate, sodium phosphate, calcium hydroxide, and magnesium hydroxide. These compounds can be used singly or in combination of two or more.

The basic compound ends up being contained as a residue in the solid composition that contains the lower molecular weight polylactic acid. On this account, considering the impact on the environment and the like, calcium or sodium is most suitable among the aforementioned basic compounds.

The basis compound is brought into uniform contact with the high molecular weight polylactic acid during melt-kneading. In view of this, it is favorable that the basic compound has a particle diameter (equivalent circle diameter) of not more than 10 μm, particularly in a range of 0.01 to 7 μm, which is measured by SEM observation, for example.

In the present invention, it is favorable that the basic compound is used in an amount of 1 to 30 parts by mass, particularly 1 to 10 parts by mass per 100 parts by mass of the above-described high molecular weight polylactic acid. When the basic compound is used in an excessive amount, it ends up being contained in a large amount in the resultant solid composition, which may impair mechanical crushability etc. required for a low molecular weight polylactic acid. On the other hand, when the basic compound is used in an excessively small amount, the molecular weight of the high molecular weight polylactic acid is not reduced sufficiently, which makes it difficult to obtain an intended low molecular weight polylactic acid.

Melt-Kneading:

In the present invention, the high molecular weight polylactic acid and the above-described basic compound are melt-kneaded, thereby reducing the molecular weight of the high molecular weight polylactic acid. As a result, it is possible to obtain a solid composition that contains as a polymer component an intended low molecular weight polylactic acid.

It is important here that the molecular weight of the high molecular weight polylactic acid is not reduced by using easily hydrolysable polyester such as polyoxalate. When easily hydrolysable polyester or the like is used as a decomposition accelerator in combination with the basic compound, molecular weight reduction proceeds more than necessary, which results in a component with an excessively lower molecular weight. As a result, it is impossible to obtain an intended low molecular weight polylactic acid. In addition, the use of such a decomposition accelerator not only increases the cost but also may change the properties of the resultant polylactic acid by copolymerization with the polylactic acid by the ester interchange reaction or the like. In the present invention, only the basic compound is used as a decomposition accelerator. Thus, it is possible to obtain a low molecular weight polylactic acid that contains no component with an excessively lower molecular weight, and to effectively avoid an increase in cost and an alteration of the polylactic acid.

The melt-kneading can be performed easily by a melt-kneading part of an extruder, for example. In particular, it is performed at a temperature in a range of 220° C. to 250° C., for example, at which the polylactic acid is not thermally decomposed. The melt-kneading is performed for at least 1 minute or more, particularly about 1 to 5 minutes, thereby obtaining an intended low molecular weight polylactic acid.

The melt-kneading has to be performed under ordinary pressure. For example, a heat treatment under high pressure using an autoclave or the like produces a component with an excessively lower molecular weight, which results in a decrease in mechanical crushing characteristics. Further, in the case of using an autoclave where heated steam is used, the basic compound is dissolved and removed. As a result, the resultant solid composition does not contain the basic compound, which impairs the benefits of blending the basic compound (e.g., hydrolyzability of the polylactic acid when it is sprayed in soil).

<Low Molecular Weight Polylactic Acid>

The slid composition of the present invention thus obtained contains as a polymer component the lower molecular weight polylactic acid. This low molecular weight polylactic acid has a weight average molecular weight (Mw) of not more than 40,000, particularly in a range of 12,000 to 40,000, and more preferably more than 12,000 and not more than 38,000, which is measured in terms of polystyrene standard by GPC. While such a low molecular weight polylactic acid exhibits a melt viscosity that is too low to be measured by a melt indexer, it contains no component with an excessively lower molecular weight, and has a molecular weight distribution with an extremely sharp monodispersed peak as shown in FIG. 1.

Further, the solid composition of the present invention contains as an inevitable component a residue of the basic compound used to reduce the molecular weight of the polylactic acid. As described later in Examples, such a residue is contained in the solid composition in an amount of 0.5 to 20 mass %, particularly 1 to 10 mass o, which is measured by a total organic carbon meter. The rest is the lower molecular weight polylactic acid contained as a polymer component.

The basic compound partially reacts with the polylactic acid to forma salt. Accordingly, the basic compound contained as a residue is smaller in amount and particle diameter than the basic compound originally added to and blended with the high molecular weight polylactic acid. Specifically, the particle diameter is reduced to not more than 3% of that of the originally added basic compound. Further, a part of the polylactic acid in the solid composition forms a salt with the alkali metal or the alkaline earth metal.

The solid composition containing the above-described low molecular weight polylactic acid can be mechanically crushed into extremely fine granular materials by a jet mill or the like. For example, the solid composition can be crushed into fine granular materials with an average particle diameter (Dso) of not more than 10 µm, particularly not more than 7 µm, which is measured by a laser diffraction scattering method. Further, these fine granular materials hardly exhibit stickiness with an extremely small mesh pass particle size of not more than 10 µm, so that the particles are effectively suppressed from aggregating with one another.

Since the polylactic acid solid composition is produced by meld-kneading without using a liquid, there is no need to separate a liquid or to extract the product from a liquid. Thus, the thus-obtained polylactic acid solid composition is available to use immediately.

Further, although the polylactic acid has a low molecular weight, it contains no component with an excessively low molecular weight that exhibits stickiness. Thus, the polylactic acid solid composition can be crushed into fine particles, which is very suitable for transportation in a bag and easy use.

EXAMPLES

The present invention will be described by way of the following experimental examples.

<Use Materials>

High Molecular Weight Polylactic Acid:

A high molecular weight polylactic acid (PLA) for use as a raw material was REVODE 101 (120,000<Mw<170,000) manufactured by Zheijiang Hisun Biomaterials Co., Ltd.

Sodium Carbonate:

As a molecular weight reduction accelerator, sodium carbonate (purity: 99.8%) manufactured by Wako Pure Chemical Industries, Ltd. was used. The average particle diameter thereof was about 900 µm.

<Molecular Weight Measurement of Lower Molecular Weight PLA>

The weight average molecular weight (Mw) of the low molecular weight PLA contained in the solid composition was measured under the following conditions.

Apparatus: HLC-8320, a high-speed GPC apparatus manufactured by Tosoh Corporation Detector: Differential refractometer RI Column: SuperMultipore HZ-M (2 columns)

Solvent: Chloroform

Flow rate: 0.5 mL/min

Column temperature: 40° C.

Sample preparation: 3 mL of a solvent was added to about 10 mg of a sample, which was then left to stand at room temperature. After a visual confirmation that the sample was dissolved in the solvent, it was filtered through a 0.45 µm filter. Polystyrene was used as a standard.

<Measurement of Sodium Carbonate Content>

The content of the sodium carbonate in the obtained solid composition was measured by the following method.

Apparatus: TOC-L, a total organic carbon meter manufactured by Shimadzu Corporation Carrier gas: High purity oxygen Carrier gas flow rate: 500 mL/min Measurement item: IC (inorganic carbon)

Calibration substance: Sodium hydrogen carbonate

Combustion temperature: 200° C.

<Particle Diameter Measurement of Contained Sodium Carbonate>

A 1 g pellet of the obtained polylactic acid solid composition was dissolved in 50 mL of chloroform. After it was visually confirmed that the PLA was dissolved and the sodium carbonate was precipitated, a supernatant was removed, which was repeated 3 times. Then, the average particle diameter (equivalent circle diameter) of the sodium carbonate was measured by SEM observation.

Example 1

The high molecular weight PLA and the sodium carbonate were quantitatively fed to a continuous twin screw extruder by respective quantitative feeders so that the mass ratio (PLA:sodium carbonate) would be 9:1, followed by melt-kneading at 220° C. for 3 minutes. Then, the melt-kneaded product was extruded to obtain a pellet of a polylactic acid solid composition.

The weight average molecular weight (Mw) of the PLA contained in this pellet was measured by the above-described method. The weight average molecular weight (Mw) was 35,000.

The weight average molecular weight distribution curve is shown in FIG. 1.

Further, the content of the sodium carbonate particles in the pellet was 7.4 mass %. The average particle diameter of the sodium carbonate particles was 1.5 μm.

Figure 2:
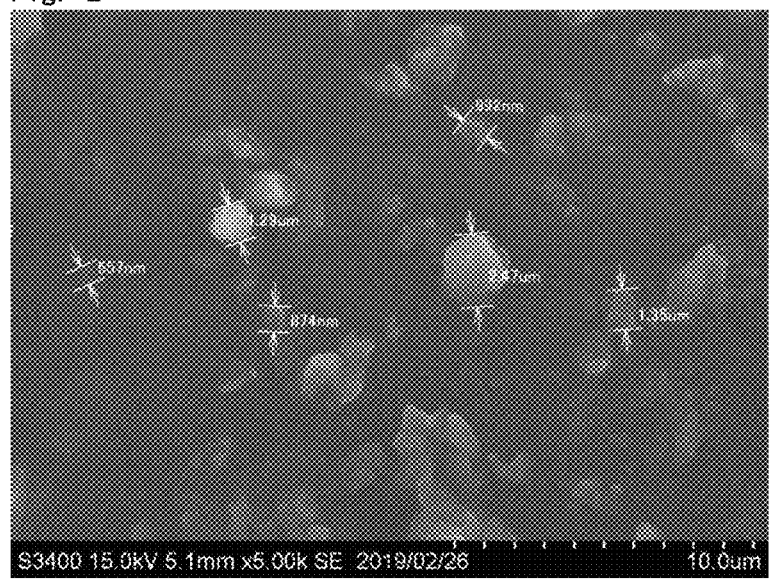
FIG. 2: a SEM photograph of sodium carbonate particles contained in the polylactic acid solid composition obtained in Example 1.
Figure 3:
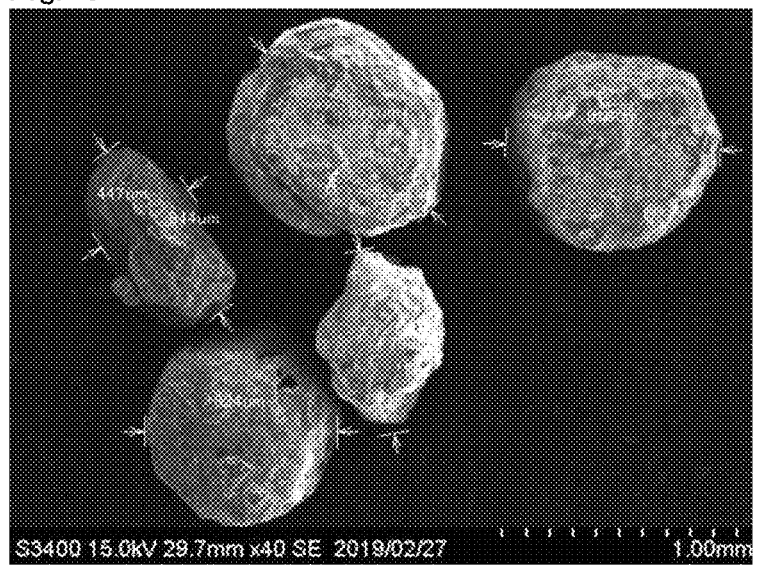
FIG. 3: a SEM photograph of reagent sodium carbonate used to produce the polylactic acid solid composition in Example 1.

FIG. 2 shows a SEM photograph of the sodium carbonate, and FIG. 3 shows a SEM photograph of the reagent sodium carbonate used as a raw material.

The obtained pellet was crushed by a jet mill held by MATERIS Co., Ltd. Resultant granular materials had an average particle diameter $D_{50}$ of 6.492 μm and a mesh pass particle size of not more than 10 μm.

Comparative Example 1

The high molecular weight PLA and the sodium carbonate were quantitatively fed to a continuous twin screw extruder by respective quantitative feeders so that the mass ratio (PLA:sodium carbonate) would be 9:1, followed by melt-kneading at 170° C. for 3 minutes. Then, the melt-kneaded product was extruded to obtain a pellet of a polylactic acid solid composition. Thereafter, this pellet was subjected to a hydrothermal treatment at 110° C. for 70 minutes by an autoclave, thereby obtaining a solid composition.

Figure 4:
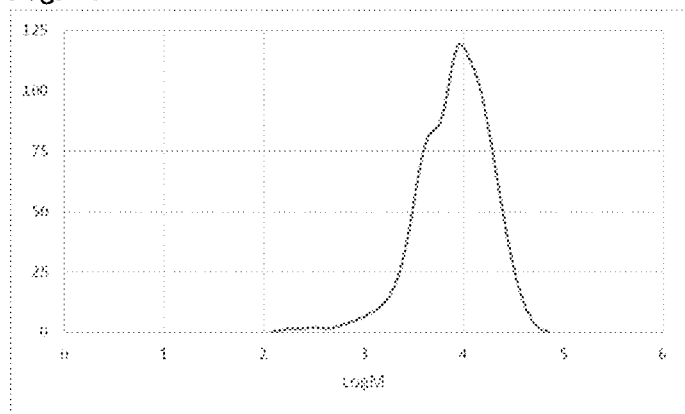
FIG. 4: a diagram illustrating the weight average molecular weight distribution curve of a polylactic acid in a polylactic acid solid composition obtained in Comparative Example 1.

The weight average molecular weight of the polylactic acid contained in this solid composition was 42,000. The weight average molecular weight distribution curve is shown in FIG. 4.

This solid composition was crushed by a jet mill in the same manner as in Example 1. Resultant particles had a particle diameter of not less than 125 μm, and were not able to be crushed any more finely.

Comparative Example 2

In exactly the same manner as in Comparative Example 1, the high molecular weight PLA and the sodium carbonate (mass ratio: 9:1) were quantitatively fed to a continuous twin screw extruder by respective quantitative feeders, followed by melt-kneading at 170° C. for 3 minutes. Then, the melt-kneaded product was extruded to obtain a pellet of a polylactic acid solid composition.

Subsequently, 200 g of the thus-obtained pellet was mixed with 400 mL of 50% lactic acid and stirred at 90° C. for 4 hours.

Figure 5:
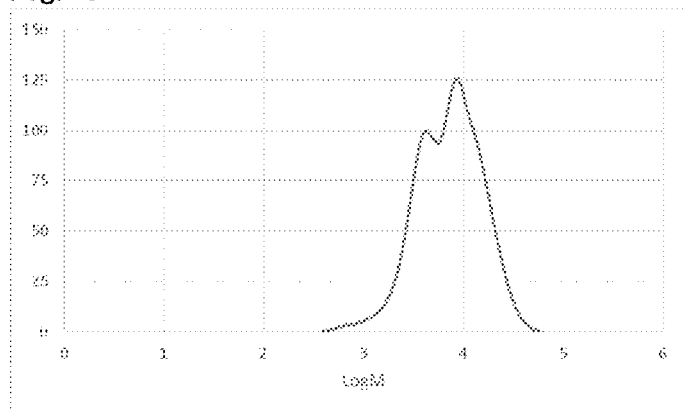
FIG. 5: a diagram illustrating the weight average molecular weight distribution curve of a polylactic acid in a polylactic acid solid composition obtained in Comparative Example 2.

The weight average molecular weight of the polylactic acid contained in this stirred mixture was 38,000. The weight average molecular weight distribution curve is shown in FIG. 5.

This solid composition was crushed by a jet mill in the same manner as in Example 1. Resultant granular materials had an average particle diameter $D_{50}$ of 6.895 μm, but the composition was less hydrolysable.

The results obtained in Example 1 and Comparative Examples 1 and 2 are shown in Table 1.

Further, 120 mg of the lower molecular weight PLA obtained in each of Example 1 and Comparative Examples 1 and 2 was weighed and soaked in 10 mL of water, which was left to stand still at 70° C. and 90° C. The lower molecular weight PLA soaked in water was weighed every 3 days. The weight residual rate was obtained by using the weight on the 0th day as 100%, and the curve of the rate of decomposition in water was obtained.

Figure 6:
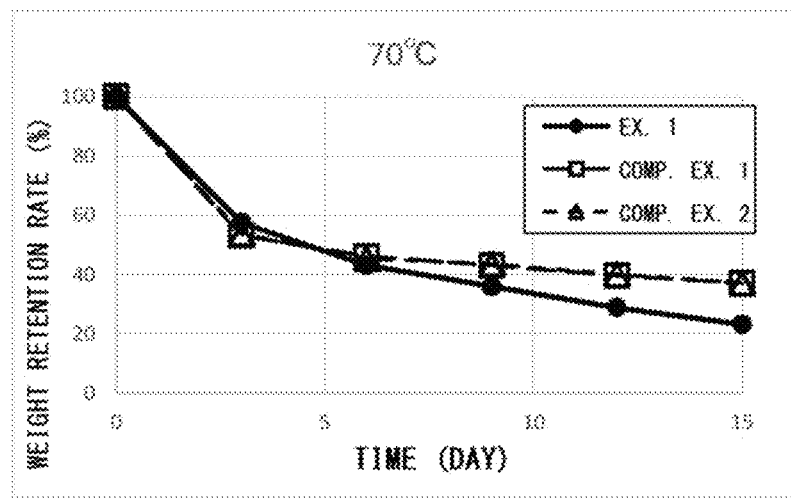
FIG. 6: a diagrammatic drawing illustrating the rate of decomposition in water at 70° C. of the polylactic acid solid composition obtained in each of Example 1 and Comparative Examples 1 and 2.
Figure 7:
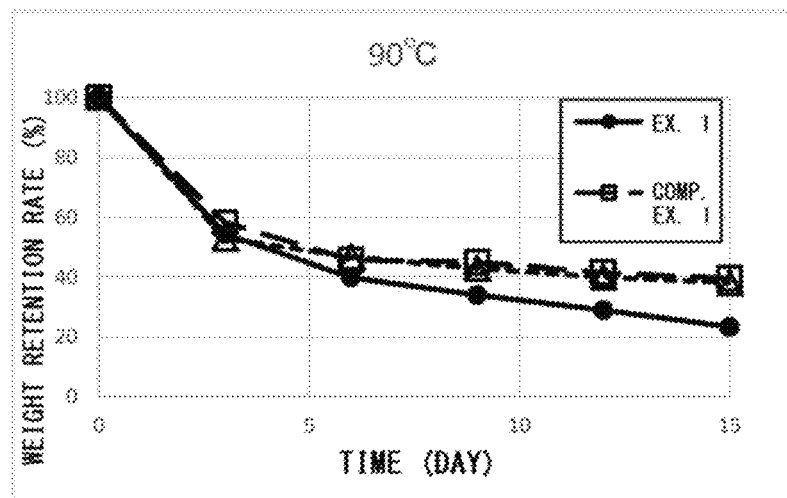
FIG. 7: a diagrammatic drawing illustrating the rate of decomposition in water at 90° C. of the polylactic acid solid composition obtained in each of Example 1 and Comparative Examples 1 and 2.

FIG. 6 shows the curve of the rate of decomposition in water at 70° C., and FIG. 7 shows the curve of the rate of decomposition in water at 90° C.

As can be understood from FIGS. 6 and 7, Example 1 is superior in hydrolyzability to Comparative Examples 1 and 2.

TABLE 1

| | Means of molecular weight reduction | Molecular weight (Mw) | Rate (%) of $Na_2CO_3$ content | Particle diameter (D50, μm) after crushing | Hydrolyzabiloity |
|---|---|---|---|---|---|
| Example 1 | Melt-kneading at high temperature (220° C.) (using $Na_2CO_3$) | 35,000 | 7.4 | 6.492 | ○ |
| Comparative Example 1 | Heated steam (autoclave) | 42,000 | 0 | 125 or more | x |
| Comparative Example 2 | Acid (lactic acid) | 38,000 | 0 | 6.895 | x |

The invention claimed is:

1. A polylactic acid solid composition comprising:
   a polylactic acid having a weight average molecular weight in a range of 12,000 to 40,000, which is measured in terms of polystyrene standard by GPC; and
   sodium carbonate, as a molecular weight reduction accelerator, wherein the sodium carbonate is contained in an amount in a range of 7.4 to 20 mass %,
   wherein the polylactic acid solid composition has a granular form with an average particle diameter ($D_{50}$) of not more than 6.492 μm, which is measured by a laser diffraction scattering method.

2. The polylactic acid solid composition according to claim 1, wherein the polylactic acid is the only polymer component contained therein.

\* \* \* \* \*